Feb. 24, 1953 J. E. MAKANT ET AL 2,629,163
CONTROL FOR MACHINE TOOLS
Original Filed Oct. 9, 1947 5 Sheets-Sheet 1

INVENTORS
JOSEPH E. MAKANT,
GORDON W. SMITHSON &
KENNETH R. WUNSCHEL
BY
Joseph N. Schofield
ATTORNEY

Fig. 2

Feb. 24, 1953  J. E. MAKANT ET AL  2,629,163
CONTROL FOR MACHINE TOOLS
Original Filed Oct. 9, 1947  5 Sheets-Sheet 3

INVENTORS
JOSEPH E. MAKANT
GORDON W. SMITHSON &
KENNETH R. WUNSCHEL
BY Joseph M. Schofield
ATTORNEY Patented Feb. 24, 1953

2,629,163

UNITED STATES PATENT OFFICE 2,629,163

CONTROL FOR MACHINE TOOLS

Joseph Earle Makant and Gordon W. Smithson, Pawtucket, and Kenneth R. Wunschel, Graniteville, R. I., assignors to Niles-Bement-Pond Company, West Hartford, Conn., a corporation of New Jersey Original application October 9, 1947, Serial No. 778,774, now Patent No. 2,594,782, dated April 29, 1952. Divided and this application November 4, 1949, Serial No. 125,578

9 Claims. (Cl. 29—50)

The present invention relates to machine tools and more particularly to fully automatic turret lathes where one of the important considerations in such a machine is to obtain, as quickly as possible, variations in the feed of the turret-slide or carriage and of the cross-slides. Such quick change feeds of machine tools has been proposed in U. S. Patent 2,357,396 wherein such variations or changes are accomplished by shifting appropriate clutches by pneumatic pressure which is electrically controlled.

The present invention has for its object the employment of pneumatic mechanism for shifting the clutches of the turret-slide and/or cross slide "feed" movements to change the rate of "feed" movements of said slides, the organization and arrangement of said pneumatic mechanism being such as to apply its clutch shifting pressures more directly and quickly to the clutches, thus eliminating many parts in the form of mechanical connections and greatly simplifying the same; and, also, to provide, as a safety feature, a novel and an improved mechanical interlocking means between the pneumatic mechanism for actuating the change-feed clutches so that only one clutch may be engaged at any one time, the arrangement being that if one feed clutch is actuated to engage its clutch, said engaging movement will effect a disengagement of all other change-feed clutches.

Another object of the present invention is the provision, in said pneumatic clutch shifting means, of a novel control mechanism for alternately engaging and disengaging a main-feed clutch and a constant speed fast-motion clutch for effecting feed or rapid movements of the turret-slide; or for stopping either of said movements of said slide.

A further object of the invention is the provision of a novel mechanism for operating slide-tools, carried by the turret-slide, from a cam device that also actuates the turret-slide, locks and unlocks the turret and indexes the latter as well as actuates a cross-slide selector, if the latter is employed.

A still further object of the invention is the provision of a novel arrangement for insuring a binding action of the turret locking means after each turret indexing operation.

Also, it is an important object of the invention to provide an electrical control circuit that controls the operations of the electro-pneumatic means from a pre-set dog drum synchronously operated from the output side of said clutches or feed-change mechanism of the turret-slide so that the timed relationship between the slide and the dog drum will not be altered, said electrical control circuit including initiating switches and relays controlling circuits embracing said initiating switches in such a manner that the turret-slide may be placed in feeding movement or quick-motion movement alternately, or either of said movement of the slide may be stopped, and, so that when one of the initiating switches is operated, it takes command of the control circuits irrespective of whether a previously operated initiating switch has been released from its initiating position.

The above broadly states the objects sought to be attained by the present invention but other objects and novel features of the invention will be apparent as the description of the invention proceeds.

This application is a division of Serial No. 778,774 filed October 9, 1947, now Patent No. 2,594,782, granted April 29, 1952.

In the drawings which show the preferred embodiment of the invention as applied to one form of machine tool and as at present devised.

The accompanying drawings above mentioned form, by reference, a part of this written description.

The type of machine with which the present invention is illustrated in the drawings is an automatic turret lathe as shown in United States Letters Patent No. 2,455,876, granted December 7, 1948 but wherein the clutch shifting mechanism, as shown in Figs. 13 to 21 inclusive of said Letters Patent, has been replaced by the present invention and, in addition, several other improvements in the machine, shown in said Letters Patent, have been made in the turret locking means and in "slide-tool" operating mechanism, as will appear as this specification proceeds. It is to be understood, however, that the invention is not to be limited to the machine illustrated and described herein but may be applied to any other type of machine to which the invention is applicable.

Figure 1:
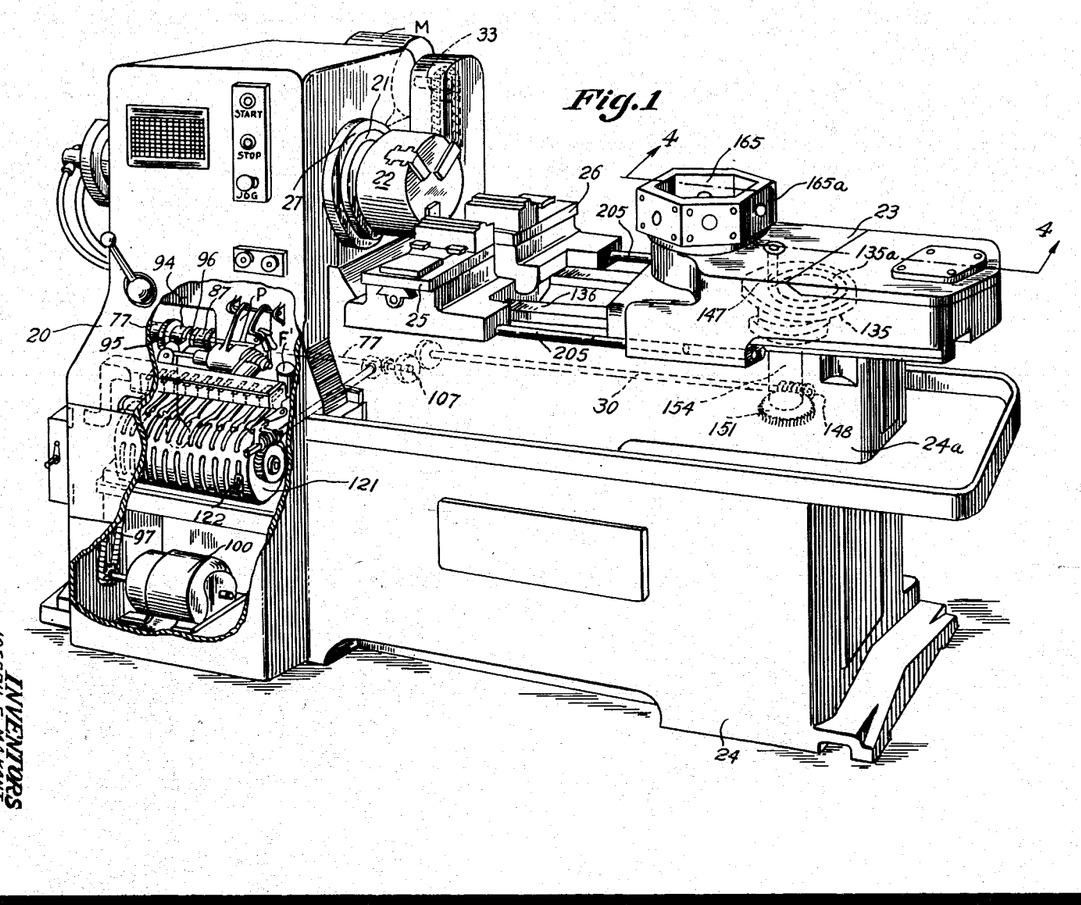
Figure 1 is a perspective view of an automatic turret lathe looking toward the front of the machine and equipped with the present invention.

In order that an understanding may be had of the machine illustrated in the drawings and to which the invention is applied, as one example, it should be stated that the machine shown in Fig. 1 of the drawings follows the general organizational pattern of the various instrumentalities found in certain types of automatic turret lathes. Such machine comprises a bed 24 at one end of which is a headstock 20 having a horizontally disposed spindle 21 rotatably journalled therein and having disposed therein the power and variable transmission units of the machine. On the inner end of the spindle and overlying the bed 24 is fixedly secured a chuck 22 in which a workpiece (not shown) may be clamped in the usual manner. Mounted on the bed 24 for reciprocable sliding movement longitudinally of the bed and parallel to the axis of the spindle 21 toward and away from the chuck 22 on the spindle 21, is a turret slide or carriage 23; and, also mounted on the bed 24 and disposed between the chuck 22 and the carriage 23, are front and rear cross slides 25 and 26, respectively, which may be operated independently or simultaneously to reciprocate at substantially right angles with respect to movement of the turret slide or carriage 23 and in cooperative relation with a workpiece that may be held on the chuck 22.

Figure 2:
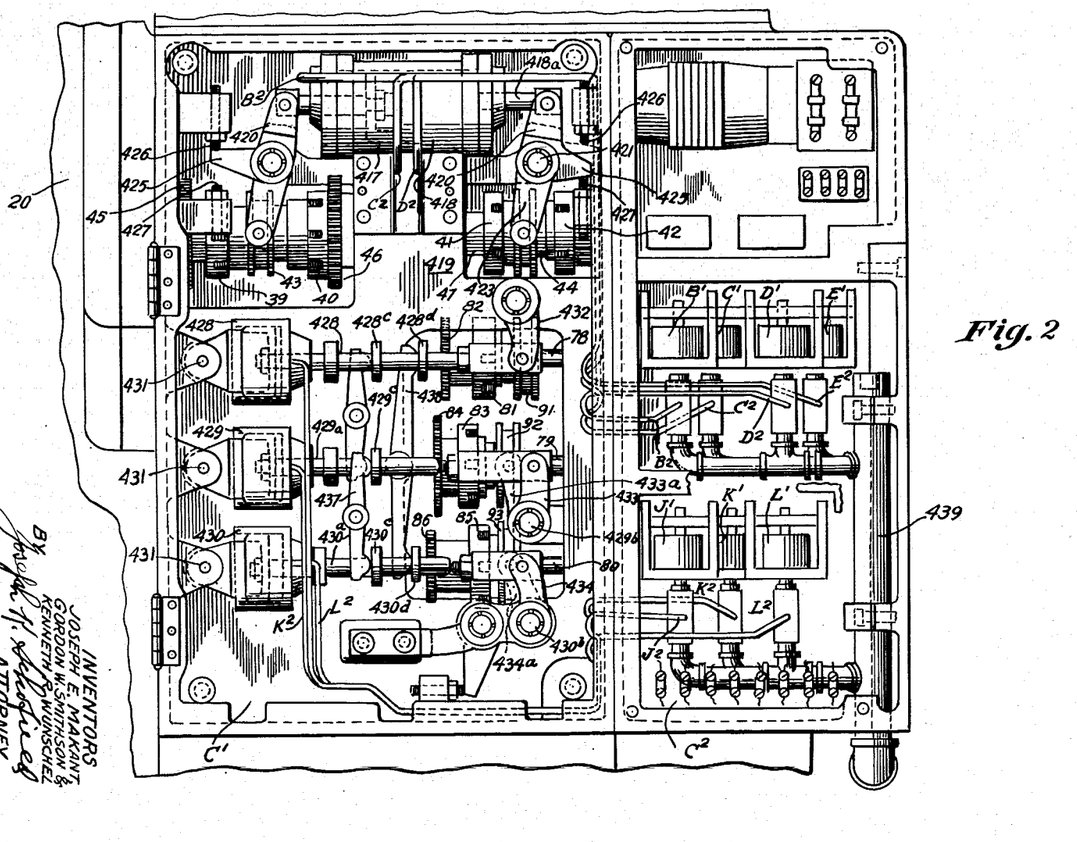
Fig. 2 is an enlarged fragmentary view of the rear of the head-stock with the door and closure plate removed to illustrate the disposition and location of certain shafts, gears and clutches; and particularly, the disposition of the pneumatic mechanism for effecting change-speed and change-feed.
Figure 3:
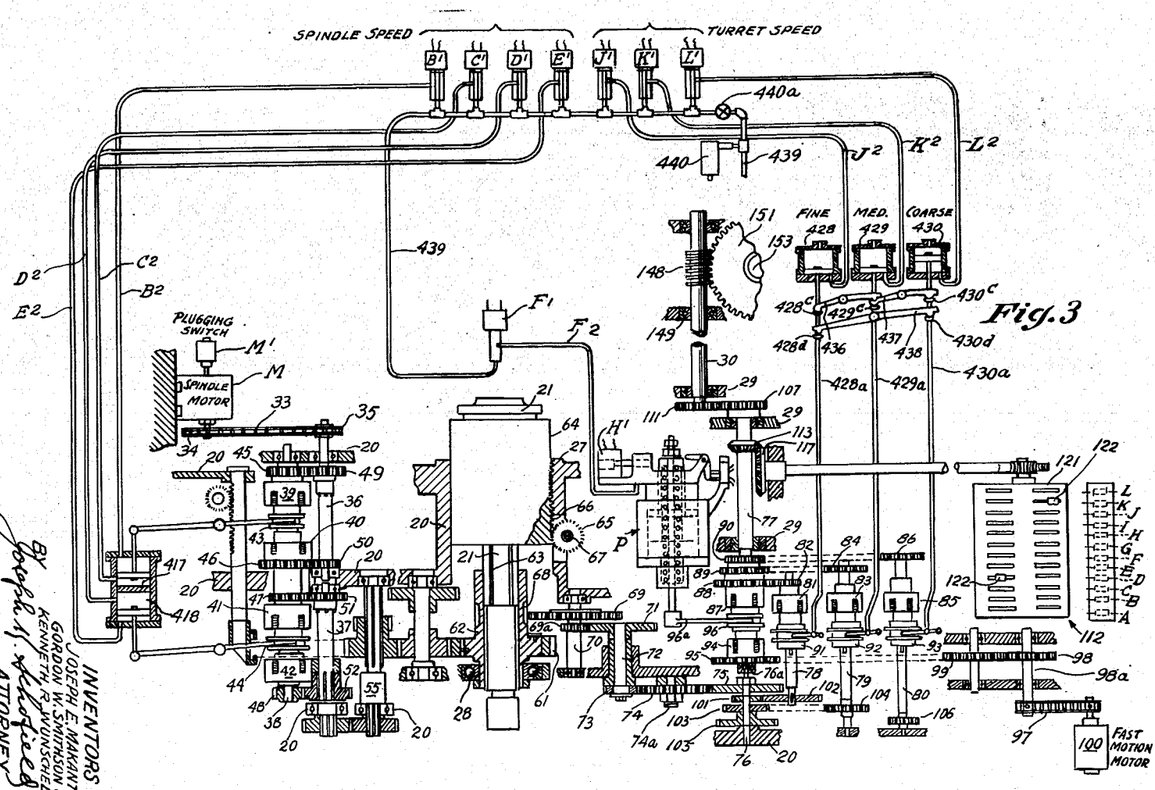
Fig. 3 is a diagrammatic view illustrating the layout of the gearing for driving the spindle and turret-slide and the disposition of the clutches for automatically changing the spindle "speed" and the "feed" movements of the turret-slide as well as the electro-pneumatic mechanism for operating said clutches.

With particular reference to Figs. 1, 2 and 3, the headstock includes an outer casing for power plant motors, transmission mechanism, including its clutches, the electro-pneumatic mechanism for shifting the clutches, the electrical control mechanism, as well as to provide bearings 27 and 28 for the spindle 21 and a bearing 29 for the feed shaft 30.

The upper portion of the base 24 provides a table-like member 24a upon which are mounted the turret-slide 23 and the cross slides 25 and 26, the mechanism for operating said turret-slide, which includes the cam disc 135, shaft 154 and worm wheel 151, being disposed respectively above and below the table 24a and being driven by the worm 148 fast on the feed shaft 30.

The spindle 21 is driven by constant speed motor M connected by a sprocket chain 33 passing over sprocket wheel 34 on the motor shaft and a sprocket wheel 35 fast on the rotatable shaft 36.

Headstock

Referring particularly to Fig. 3 it will be seen there are two axially aligned shafts 36 and 37 mounted in suitable bearings in the headstock frame 20, the shaft 36 being, what may be termed, the speed input shaft and the shaft 37 being the speed output shaft. Also journalled in the headstock 20 in cooperative relation and parallel with the aligned shafts 36 and 37 is a rotatable counter-shaft 38 which has rotatably mounted upon it four clutches 39, 40, 41 and 42 arranged in two opposing pairs, each pair being served by a single sliding part or cone, respectively, for instance, clutch heads 39 and 40 being served by the clutch cone 43 and the clutch heads 41 and 42 being served by the clutch cone 44 thus, when the clutch cones 43 and 44 are engaged with any one of their clutch heads, the other clutch head of each pair is disengaged. The clutches may be of any suitable type although, in the present showing, disc-clutches are illustrated. The sliding parts or cones 43 and 44 are splined on the shaft 38 and are shifted by suitable yokes, as can be seen more particularly from Fig. 3. Each of the clutch heads 39, 40, 41 and 42 have fast therewith gears 45, 46, 47 and 48, respectively, of different sizes to effect the automatic change speeds desired. The gears 45 and 46 of clutch heads 39 and 40 mesh, respectively, with their mating gears 49 and 50 fast on the speed input shaft 36 while the gears 47 and 48 of clutch heads 41 and 42 mesh with their mating gears 51 and 52 fast on the speed output shaft 37.

As the above matter fully describes the specific spindle speed changing mechanism, further description of this part of the machine is not thought to be necessary.

Feed shaft drive

The drive for the feed shaft 30 (which actuates the turret-slide 23 and cross-slides 25 and 26) is connected directly with the spindle 21 so that the feed will always be in ratio per revolution of the spindle. This feed drive is taken off of the spindle sleeve 62, which has teeth 68 cut therein meshing with a gear 69. The gear 69 is keyed to a jack shaft 70 which has a spur gear 69a fast thereto for driving gear 71 keyed to one end of a stub shaft 72 which also has gear 73 fast thereon to drive gear 75, through the intermediate gears 74. The gear 75 is keyed to an input speed shaft 76 which is aligned with and rotatably independent of an output speed shaft 77 for the feeding movements to the turret-slide 23 and the cross-slides 25 and 26.

From this input shaft 76, various feed changes may be obtained through the medium of hand-change gears for the tool slides as well as three automatic feed changes of any selected feed obtained by the hand-change gears. As shown in Fig. 3, three separate and independent countershafts 78, 79 and 80 are grouped about the aligned input and output shafts 76 and 77 and suitably journalled in the housing 20. Each of these countershafts 78, 79 and 80 has rotatably mounted thereon a clutch head 81, 83 and 85, respectively, each clutch head having a mating gear 82, 84 and 86 fast thereon, respectively, which gears are of different sizes, and mesh, respectively, with a cluster gear fast to a main feed clutch head 87 rotatably mounted on the output speed shaft 77. The cluster gear comprises three gear members 88, 89 and 90 which are in constant mesh with gears 82, 84 and 86, respectively. Also, each of said countershafts 78, 79 and 80 has a sliding clutch part or cone 91, 92 and 93, respectively, splined thereon for reciprocating into and out of engagement with the clutch heads on said countershafts.

The output shaft 77 has a quick return clutch head 94 rotatably mounted thereon and carrying with it a mating gear 95. The clutch head 94 is in opposed cooperative relation with the main feed clutch head 87 so as to be served by the clutch slide or cone 96 splined on the shaft 77, whereby one of the clutch heads 87 or 94 will be engaged when the other is disengaged or both disengaged when the cone is in a neutral position. The quick return clutch head 94 is for connecting the shaft 77 with the motor 100 for effecting quick idle motions of the tool slides 23, 25 and 26 and, to this end, its mating gear 95 is driven from the motor 100 through appropriate gearing.

The countershafts 78, 79 and 80 are driven from the input shaft 76 through hand-change gears (101—102, 103—104, and 105—106 respectively) splined on the ends of said shafts so that they can be readily removed manually through a suitable opening in the casing 20 to effect various ratio combinations of speeds between the input shaft 76 and said countershafts in a manner well known in the art. With the selection of hand-change gears shown, the fine or first feed countershaft 78 of the feeding mechanism is driven by gears 101 and 102; the second or intermediate feed countershaft 79 is driven by gears 103 and 104; and the third or coarser feed countershaft 80 is driven by gears 105 and 106, all, as above stated, are hand-change gears well known in the art.

The three automatic changes of speed of feed of the tool slides are obtained in the following manner:

1. For fine feed of movement of the tool slides and all of the clutch cones 91, 92 and 93 being out of engagement with their respective clutch heads, the clutch cone 91 is moved into clutching engagement with the clutch head 81 and cone 96 is moved into engagement with main feed clutch head 87, thus the drive being from input shaft 76 through hand-change gears 101, 102, shaft 78, clutch head 81, gears 82, 88, and main feed clutch head 87 to output shaft 77. It may be noted here that the clutch cone 96 is in engagement with the main feed clutch head 87 during all feeding operations and is only moved out of engagement therewith when it is desired to effect the quick idle movements of the tool slides or when the feed mechanism is hand operated for "setting-up" or the machine stopped;

2. For the second or intermediate feed of the tool slides, and cones 91 and 93 being disengaged from their respective clutch heads, the cone 92 is moved in engagement with clutch head 83, thus the drive being from input speed shaft 76, through hand-change gears 103, 104, shaft 79, clutch head 83, gears 84, 89, and main feed clutch head 87 to output shaft 77; and 3. For the third or coarse feed of tool slides and with the clutch cones 78 and 79 disengaged from their respective clutch heads, clutch cone 93 is moved into engagement with clutch head 85, thus the drive being from speed input shaft 76 through hand-change gears 105, 106, shaft 80, clutch head 85, gears 86, 90, and main feed clutch head 87 to output shaft 77.

As will be seen hereinafter, the mechanism which operates the clutch cones 91, 92 and 93 is to be interlocked so that when any one of the three clutch cones is operated to engage its clutch head, they automatically disengage any other of said clutch cones that was previously in engagement, this being a safety feature which permits only one of the three feed clutches to be engaged at one time while the other clutch heads and their mating gears run idle on their respective shafts. Also, the countershafts 78, 79 and 80 are rotated continuously from the input shaft 76 through their aforesaid respective hand-change gears while the machine is in operation.

The fast motion of the tool slides 23, 24 and 25 (that is, their idle motion from the time that any tool when in operation has finished cutting and is brought back to clear the subject being machined, the turret indexed, and then moved forward to bring the next set of tools to the subject) is obtained by means of the fast motion motor 100 through sprocket chain 97 trained over pinions on motor shaft and shaft 98a to drive meshing idler gears 98 and 99, which latter meshes with mating gear 95 of fast motion clutch head 94. The motor 100 runs at constant speed continually during the operation of the machine and when the fast motion clutch head 94 is engaged automatically by clutch cone 96, thereby disengaging the main feed clutch 87, "fast motion" is imparted to output shaft 77. When the tools of the turret-slide 23 and/or the cross slides 25 and 26 are again in position for cutting operations on the work-subject, the quick return clutch 94 is disengaged and the main feed clutch 87 is engaged by the cone 96 whereby shaft 77 is again brought to feeding motion. When "fast motion" is in operation, cluster gear 88—89—90 runs idle on shaft 77 and shaft 76 runs idle in the end of shaft 77, as shown at point 76a.

From output shaft 77, "feed" or "fast motion" is transmitted to the feed shaft 30 (which operates turret-slide 23 and cross-slides 25 and 26) through gear 107 fast on shaft 77 and meshing with gear 111 keyed on feed shaft 30.

Tool slides

As above stated, all movements of the main or turret-slide 23 and of the cross-slides 25 and 26 are actuated from a single disc-cam 135 driven from the feed shaft 30 having worm 148 fast thereon and meshing with worm gear 151 fast on the arbor 154 of said disc-cam, which latter also unlocks the turret, indexes the turret 165, if one is employed, actuates a cross-slide preselector device S that renders effective and ineffective the connection for operating the cross-slides 25 and 26 from the movement of the main or turret-slide 23 (see Figures 1, 3 and 4), all as more particularly shown and described in the copending application above mentioned.

The present invention, however, embodies the improvements, over the disclosures in the aforesaid Letters Patent, namely, (1) for positively forcing the turret lock-bolt 175 back to locking position to effect an accurate indexed position of turret and positive binding locking or clamping of the turret in indexed position, which has a marked effect on the accuracy of the work produced by the machine; and (2) a "slide-tool" operating device—all actuated from the same disc-cam 135 in addition to its other function as mentioned in the preceding paragraph.

The main or turret slide 23 is of a hollow flat box-like formation with a relatively wide central longitudinal slot 23a on its bottom side. The marginal edge portions of the slot 22a are offset to form channels slidably resting upon trackways 136 and 137 upon which the slide 23 is reciprocated to and fro with respect to the chuck 22 by the horizontally disposed disc-cam 135 positioned within the slide 23 and above the ways 136 and 137. The cam 135 is provided with a substantially heart-shaped box-cam groove 135a on its upper surface and a cam roll or follower 147, carried on the under face of the top wall of the slide 23, extends into said cam groove 135a, the cam 135 rotating in the direction of the arrow shown in Fig. 5.

Figure 4:
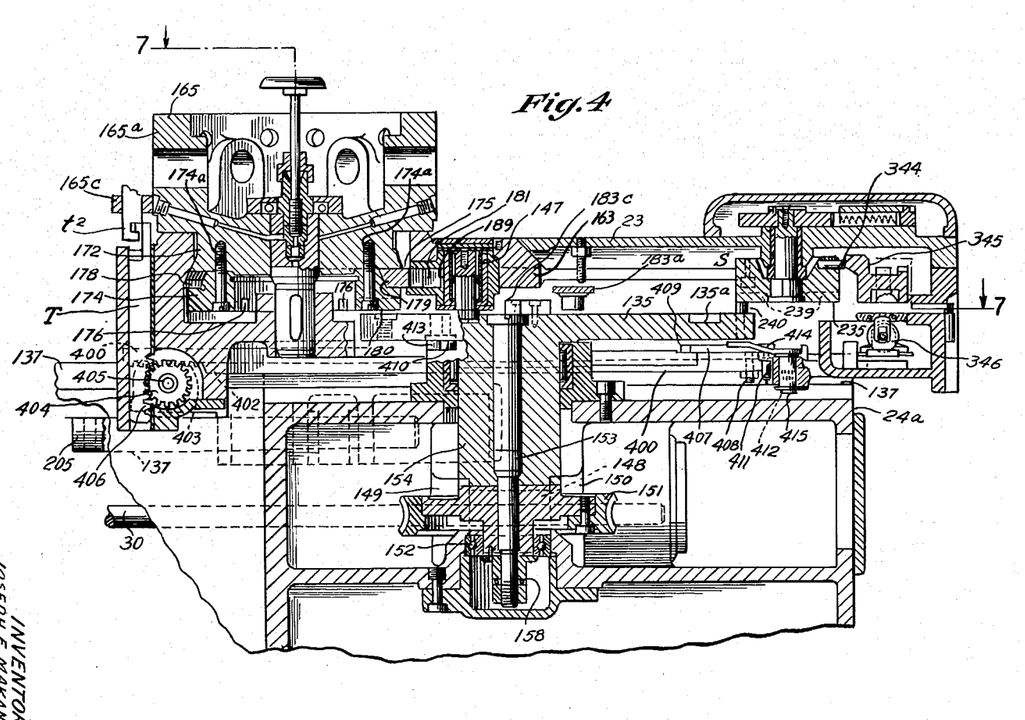
Fig. 4 is a central longitudinal sectional view taken vertically through the turret slide.

The disc-cam 135 makes one revolution for each full reciprocatory movement of the slide 23—i. e., from its rear starting point (when the turret 165 is indexed) forward toward the chuck 22 and back to its starting point. The slide 23 is shown in Figs. 1, 4 and 5 in its rear or starting point position and just after the turret has been indexed and locked into position by the wedge-lock-bolt 175.

The turret 165 has vertically disposed polygonal tool-carrying faces and has a depending hub 172 rotatably mounted about a vertical axis in the forward end of the main slide 23, the tool-carrying faces extending above the slide 23 to oppose the chuck 22. Applied to the lower end of the hub 172 is an index and lock disc-plate 174, in the form of an annulus, secured by bolts 174a. The under surface of the disc-plate 174 is provided with a plurality of grooves 176, one for each face of the turret and arranged in a somewhat radially offset, as indicated by dotted lines in Fig. 4, to receive an indexing pin 180 on the disc-cam 135—after the manner of a Geneva-movement—for indexing the turret. The upper surface of the disc-plate 174 is reduced in diameter to provide a circular groove 178 underlying the hub 172 and with the perimetral surfaces of the reduced portion formed polygonally, as at 179, to correspond with the number of and the position of the turret faces. The polygonal surfaces 179 are upwardly and inwardly inclined to be engaged by a corresponding surface on the wedge-lock-bolt 175.

Figure 5:
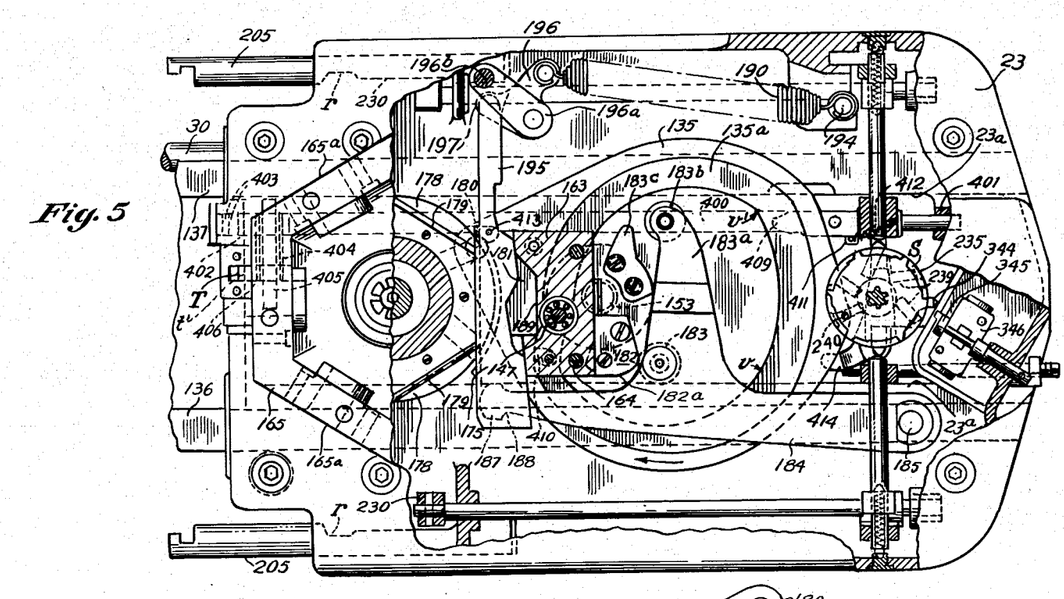
Fig. 5 is a plane view of the turret-slide taken substantially on line 4—4 of Fig. 1.

The wedge-lock-bolt 175 is supported in a horizontally slotted or bifurcated front face 181 of the guide-block 163 with the bottom wall or crotch of the slot oblique, as indicated in Fig. 5 of the drawings, to provide a wedge slot so that the wedge-bolt 175 slides into such slot longitudinally thereof and transversely of the machine and under the action of a biasing spring 190 to locking position its straight chamfered forward edge will bear against the complemental chamfered surface 179 on the disc-plate 174, the opposite edge of wedge-bolt 175 being formed complemental to the bottom wall of the wedge slot 181.

At a point in the rearward return movement of slide 23 and before it reaches its rearmost position, the disc-cam 135 moves plate-cam 182, mounted on its upper surface, into engagement with roller 183 carried by lever 184 to swing the lever 184 counter-clockwise with respect to Fig. 5, thus withdrawing the wedge-lock-bolt 175 against the tension of the spring 190 to release the turret 165 for indexing. The lever 184 has one end fulcrumed at 185 to a rear portion of the slide and its other end formed with a radius extremity 187 extending into a correspondingly forward slot 188 at one end of the back bolt 175.

When the bolt has been so withdrawn the indexing pin 180 will have been moved to enter one of the indexing grooves 178, which groove has been brought to position to receive the indexing pin 180 by a previous indexing of the turret. Having entered the groove and continued in its movement with cam-disc 135, the pin 180 has indexed the turret 165 one position or face and is shown in Fig. 5 as now leaving said groove.

During this indexing of the turret 165, the cut-out portion 189 of the guide block 163 and the cut-out portion 189a of the wedge-lock-bolt received complemental portions of said lock-bolt and guide block, respectively, thus providing sufficient clearance to allow indexing of said turret.

After the indexing pin 180 has substantially completed the indexing of the turret, the dwell 182a on the plate cam 182 releases the arm 184 to allow the biasing spring 190 to draw the wedge-lock-bolt 175 and snap it into the position shown in Fig. 5 where it wedges itself between the oblique bottom surface of slot 181 and the opposing chamfered surfaces 179 on the disc-plate 174 secured to the bottom of the turret.

As before stated, an improvement of the present invention over the aforesaid copending application, resides in arrangement of the biasing device 190 and in means on the disc-cam 135 for positively wedging the wedge-lock-bolt 175 in its turret locking and binding position after having been preliminarily brought to that position by said biasing device 190.

To this end and referring to Fig. 5, the spring 190 is disposed within the slide 23 along its rear or back side and has one end anchored thereto by a stud 194 while its other end, adjacent the wedge-lock-bolt 175, is connected to one end of a bell-crank lever 196 of a compensating toggle. The other end of the bell-crank lever 196 is pivoted to the wedge-lock-bolt 175, as at 197, by a link 195. The compensating toggle further comprises a link 196a pivotally connected to intermediate elbow portion of the bell crank lever 196 and pivotally supported by a pin or bolt 196b fixed on the under surface of the top-wall of the slide 23. This compensating toggle, biased by the spring 190, produces a very effective snap action on the wedge-lock-bolt 175 in returning it to lock position. Under certain machine operating conditions, the action of the spring 190 alone is inadequate to accomplish both the accurate location and binding of the turret 165. To overcome this situation the intermediate arm 183a on lever 184 and which carries the cam roller 183, is extended laterally across the disc-cam 135 to have its free end lie on the other side of the axis 153 of said disc-cam 135. This free end of the arm 183a carries a cam roll 183b which is engaged by a lug-cam 183c, adjustably secured to the top surface of the disc-cam 135, after the spring 190 has returned the wedge 175 to its turret locating and binding position, and thus exerts a pressure on the lever 184, which tends to move it in a clockwise direction in Fig. 5 and causes its radius extremity 187 to exert a squeezing action on the wedge-lock-bolt 175 to positively seat the latter and accurately locate and bind the turret 165 in position.

At or about the same time the turret 165 is indexed, a pin 240 on the disc-cam 135 enters in one of a plurality of radial indexing grooves 239 in the undersurface of an indexible wheel 235 of a cross-slide selector S, which may be rendered effective, according to the manner the selector has been "set-up" for a particular production operation, any one or both, or neither, of the cross-slides 25 and 26, as is fully shown and described in said copending application. It will suffice to say that latch members 230, controlled by the selector S, engage or disengage keepers r on push-rods 205 which actuate said cross-slides from the to-and-fro movement of the turret-slide 23. Also, upon each revolution of the selector S, a lug 344 on the disc 235 oscillates a crank 345 of lubricating pump 346.

After the turret has been indexed and locked and the proper selection of the cross-slides has been made, the slide 23 is actuated by the disc-cam 135 with quick or fast motion from motor 100 through clutch 94, shaft 77 and shaft 30 toward the chuck 22 until the tools (not shown) on the turret face are about to contact the workpiece (not shown) held by the chuck. At this time a dog 122 on dog drum 121, acting through means later to be described, shifts clutch cone 96 disengaging quick motion clutch 94 and engaging main feed clutch 87, thus actuating the slide 23 of slow cutting feed movement until that cutting operation has been performed. It is, of course, understood that the cycle of operation of the machine is governed by the number of faces of the turret 165 or by the number of such faces as may be employed for any operation upon a workpiece according to the "set-up" of the machine, for instance, the machine may be equipped with a "skip face" mechanism not shown. Consequently, at the end of each forward feeding motion of the turret slide 23, when the slide follower 147 is in the dwell portion ($v$—$v'$) of the cam-groove 135$a$ of disc-cam 135, a vertically movable "slide-tool" actuator T is operated, which is mounted on the forward end of the turret-slide 23. The mechanism for operating this actuator T is another improvement of this invention.

A "slide-tool" actuator T employed on most of the automatic chucking-turret-lathes consists of a slidably mounted bar having a notched upper end $t'$ which interengages with a similar or complemental notch member $t^2$ of the slide-tool device 165$c$ secured to any selected face of the turret 165. Therefore, any face of the turret 165 carrying such a slide tool and when indexed to operative position, the member $t^2$ of the slide-tool will interengage with the end $t^1$ of the actuator T. These slide tools are usually employed for grooving and internal recessing on the workpiece. Vertical movement is imparted to the slide-tool actuator T by a bar 400 disposed within the slide 23 below the disc-cam 135 and extending longitudinally of the turret-slide 123 between the axis 153 of said disc-cam 135 and the way 137. The rear end of the bar 400 is reduced and slidably mounted at 401 in a bearing formed on the turret-slide 23. The forward end of the bar 400 is similarly slidably mounted at 402 in a bearing formed in the turret slide 23 and is provided with a series of rack teeth 403 which mesh with an elongated pinion 404 whose axis is journaled in bearings on the turret-slide as at 405. The actuator T is also formed with rack teeth 406 which mesh with pinion 404. (See Fig. 5.)

Disposed adjacent the rear end portion of the rod 400 and on the top surface thereof is a flat elongated abutment plate 407 pivoted intermediate its length to said bar on a vertically disposed pin 408 fast in said bar. The forward end 409 of the latch member 407 may be beveled, as shown, to be engaged by a pin 410 depending from the underside of the disc-cam 135 to shift the bar 400 rearwardly, which motion is transmitted by the pinion 404 to the slide-tool actuator T to move the same vertically and, thus, actuate the slide-tool. The abutment plate 407 is formed at a rear corner portion with a depending lug 411 which abuts the adjacent side of the bar 400 to prevent swinging movement of the abutment plate 407 when it is engaged by the pin 410 in the manner just described, the abutment plate 407 being normally biased to the position shown in Fig. 4 by a spring 412 having one end connected with the lug 411 and the other end anchored to the bar 400.

The bar 400 is returned to its position shown in Fig. 4 by a pin 413 projecting from the underside of the disc-cam 135 and which pin will engage the free end of the bell crank lever 414 pivoted at 415 to an extension projecting from the sump wall of the pump 346. The other end of the lever 414 extends between confining shoulder formed by a recess 416 in the bar 400. When the free end of the bell crank lever 414 is contacted by the pin 413, it will rotate the bell crank lever on the pivot 415 in a counter-clockwise position and return the bar 400 to its full line position shown in Fig. 4, and thus move the slide-tool actuator T downwardly to its original or starting position.

Figure 6:
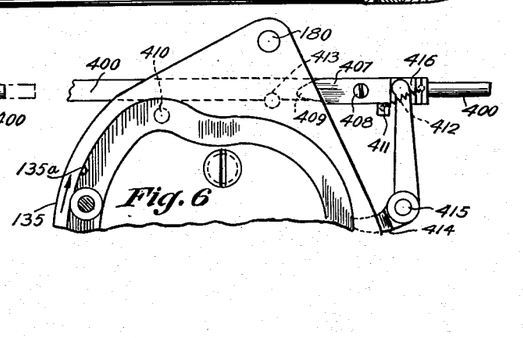
Fig. 6 is a fragmentary schematic showing of the slide tool actuating mechanism operable from the turret operating cam.
Figure 7:
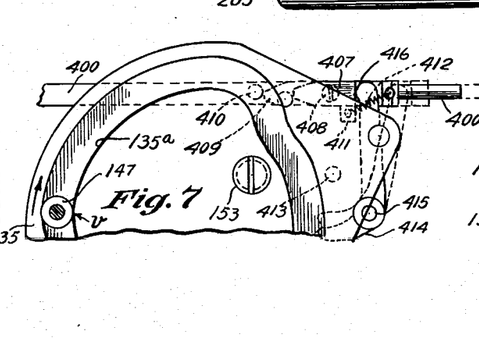
Fig. 7 is a fragmentary schematic illustration similar to Fig. 6 showing the slide tool actuator being operated by the turret operating cam.

When viewing Fig. 5, it may not be readily apparent that the pin 410 would ever contact the latch member 408 or the pin 413 would ever contact the lever 414. In this connection it must be realized that the axis 153 of the disc-cam 135 is fixed in relation to the longitudinal movement of the turret-slide 23 which carries the bar 400. By referring to Fig. 6 it will be observed that, before the cam follower 147 approaches the dwell in the cam groove 135, pin 413 passes in forward end 409 of the abutment plate 407; but just as cam follower 147 enters the cam dwell at $v$ (see Fig. 7) the turret-slide 23 is then in its position nearest the chuck 22 and pin 410 will contact the end surface 409 of the abutment plate 407 and push the bar 400 rearwardly for a distance and for a duration sufficient to effect the operation of the slide tool actuator T. By further reference to Fig. 7, it will be observed that, when the bar 400 has been pushed rearwardly to the limit of its distance by the pin 410, it will assume a position indicated in dotted lines and the free end of the lever 414 will have been swung into the path of the pin 413 and will be contacted by pin 413, after pin 410 passes by the abutment plate 407, and thus impart a counter-clockwise motion to the lever 414 and return the bar 400 to its original initial position.

The abutment plate 407 is pivoted in the manner above described so that, if the machine is hand-cranked backwards that either of the pins 410 or 413 come in contact with the forward end of the abutment plate 407, said abutment plate will swing clockwise on its pivot 408 thereby averting any jamming which would otherwise occur, the relative movement of said pins and of the turret slide 123 being such that the pins would only strike the abutment member 407 forward of the pivot pin 408.

*Control mechanism*

From the above, it should be clear, particularly from Fig. 3, that by clutch cones 43 and 44 selectively engaging their respective clutch heads 39—40 and 41—42, four automatic speed changes of the spindle 21 are effected, that by clutch cones 91, 92 and 93 selectively engaging their respective clutch heads 81, 83 and 85, three automatic changes in the feed movement are effected for cutting operations of the turret slide 23 and the cross slides 25 and 26 and that, by clutch cone 96 alternately engaging its clutch heads 87 and 94, movements will be transmitted to said slides and the slides will be moved at their feeding rate or in rapid motion from the quick or rapid motion motor 100, respectively, or, when the clutch cone 96 is in intermediate or neutral position, all automatic motion is disconnected from the said shaft 30 and the dog drum 121, and, consequently, from the tool slides 23, 25 and 26. It will be understood that a cycle of the machine embraces an operation where the turret-slide 23 has reciprocated back and forth relative to the spindle a number of times corresponding to the number of faces on the turret 165 or to the number of faces that have been brought to indexing position for the tools thereon to perform work on a given subject workpiece. The operation of the clutches, just mentioned, is attained by the electropneumatic mechanism schematically shown in Fig. 3 and more particularly shown in its arrangement and organization in the present machine in Figs. 1 and 2.

The electropneumatic mechanism, for actuating the speed-change and feed-change clutches, includes air cylinders 417, 418, 428, 429 and 430 disposed in a compartment C' at the rear of the headstock 20 and arranged adjacent the clutches which they actuate; and to one side of the air cylinder compartment c' is another compartment c² in which are disposed the solenoid air-valves for said cylinders, as shown in Fig. 2. An important feature of the present invention is the positioning of the air cylinders so that their operating pistons are connected directly to the yoke which shifts the clutch cones, thereby eliminating the number of parts (such as connecting rods, linkage, etc.) which not only complicate the mechanism but develop lost motion and consequently affect the spontaneous operation of said clutches. As shown in Fig. 2, air cylinders 417 and 419 are mounted on a vertical web or partition 419 within the headstock 20 and in close proximity to the feed-change clutches 39—40 and 41—42, respectively. These air cylinders may be one casting or unit divided by a central partition. Each cylinder is provided with a stemmed piston 417a and 418a, respectively, the stems or rods of said pistons being arranged substantially parallel to the axis of said clutches 39—40 and 41—42. The cylinders 417—418 are preferably arranged so that their respective piston rods extend from them in opposite directions and disposed adjacent the clutch cones 43 and 44, respectively, the ends of the piston rods being pivotally connected, respectively, to the rocker arms 420 fast on shafts 421 extending through and suitably journaled in partition walls 419, the other end of said shafts having fast thereon rocker arms 423 attached to clutch yokes 424 extending in the circumferential groove in their respective clutch cones 43 and 44. On each lever 420 is a projecting lug 425 which moves between adjustable abutments 426 and 427 so that the movement of the clutch cone may be nicely adjusted.

Both cylinders 417 and 418 are connected with an air pressure source at their opposite ends so as to render the pistons therein double acting— that is, power operated in both directions. Thus, one end of the cylinder 417 is connected by the air line B² to the solenoid air valve B' so that the piston 417a may be moved to operate the cone 43 to engage the clutch 39 and disengage said cone from the clutch 40, while the other end of the cylinder 417 is connected by an air line C² to solenoid air valve C' so that the piston 417a may be moved to operate the cone 43 to engage clutch 40 and disengage clutch 39 (see Fig. 3). Cylinder 418 is connected by air line D² to solenoid air valve D' to move piston 418a to operate cone 44 to engage clutch 41 and disengage clutch 42, while the other end of cylinder 418 is connected by air line E² to solenoid air valve E' to move its piston 418a to operate clutch cone 44 to engage clutch 42 and to disengage clutch 41 (see Fig. 3). The solenoids of these air valves B', C', C', and E' are energized respectively by the single-pole snap-switches B, C, D, and E which are closed by appropriate dogs 122 adjustably mounted, as required for a desired operation of machine, on the dog drum 121 to effect the four speed-changes which have been described above.

As can be seen from Fig. 3 and the disposition of the shafts in Fig. 2, the gears 82, 84 and 86, which are driven by the clutches 81, 83 and 85 respectively, are grouped about the cluster gear (88—89—90) fast with the main feed clutch 87. The feed gears 82, 84 and 86 and the respective clutches 81, 83 and 85, are shown in Fig. 2 together with their clutch cones 91, 92 and 93 (although for the purpose of clarity, the main feed clutch 87 and its cluster gear is not shown in Fig. 2). The clutch cones 91, 92 and 93 are actuated to engage their clutches by air actuated pistons 428a, 429a and 430a mounted, respectively, in air cylinders 428, 429 and 430 pivotally mounted at one of their ends, at 431, to an end wall of the headstock casing 20 so as to permit slight movement of the cylinders to compensate for operational movements of their pistons. The rods of pistons 428a, 429a and 430a extend from the other end of their cylinders and in the same general direction as the shafts 78, 79 and 80 upon which the clutch cones 91, 92 and 93 are splined and each piston rod is operatively connected with one of said cones, respectively. Said connections between the piston rods 428a, 429a and 430a and their respective cones 91, 92 and 93, are identical and comprise the free end of the lock piston rod being connected to rocker arms 432, 433 and 434, respectively, which are fast on one end portion of shafts 428b, 429b and 430b, respectively, and the other end of said shafts being disposed adjacent their clutch cones 91, 92 or 93 and having fast thereon a rocker arm 432a, 433a and 434a which carries a yoke 91a, 92a and 93a each extending into a customary circumferential groove in their clutch cones. Said shafts 428b, 429b and 430b are journaled in the vertical partition wall 419.

Feed-change cylinders 428, 429 and 430 are each connected by air pipe lines J², K² and L² to their respective solenoid air valves J', K' and L' so as to be single-acting under air pressure for engaging their respective clutches 81, 83 and 85 when air is introduced into said cylinders. As shown in Fig. 2, the piston 430a has been air actuated to engage clutch cone 93 with the clutch 85 and, when air is released from the cylinder 430 by the exhausting of its solenoid air valve L', the clutch cone remains engaged with the clutch 85. When one of said clutches 81, 83 and 85 are so engaged, the other of said clutches are disengaged by a very simple and novel arrangement of three levers 436, 437 and 438, and which arrangement is permitted by the air cylinders 428, 429 and 430 and their respective pistons being disposed in spaced side-by-side position and in substantially the same plane, as shown in Figs. 2 and 3. To this end, the rods of pistons 428a, 429a and 430a are each provided with adjustable shoulder or abutment 428c, 429c and 430c, respectively. A teeter lever 436, intermediately pivoted to the partition 419, extends between piston rods 428a and 429a and has its ends in the plane of movement of said shoulders 428c and 429c to be contacted by the latter. A similar teeter lever 437 has its ends similarly disposed between shoulders 429c and 430c and pistons 429a and 430a. A third teeter 438 is similarly mounted as the other two but extends between the piston rods 428a and 430a, and has its ends in the path of movement of abutting contact shoulders 428d and 430d. Thus, it will be seen that if air is admitted to any one of cylinders 428, 429 or 430, the pistons of the other two cylinders will be moved to the right, in Fig. 2, and fully disconnect the clutches associated therewith—provided, the air pressure has been exhausted from said latter two cylinders. It will be obvious that this arrangement of levers 436, 437 and 438 also serves as a mechanical interlock and assures against more than one clutch 81, 83 or 85 being engaged at any one time. The solenoids of these feed-change air valves J', K' and L' are energized, respectively, by the single-pole snap-switches J, K and L which are closed by appropriate dogs 122 adjustably mounted on the dog drum 121 to effect the desired changes in the feed movement of the turret-slide 23 and cross-slides 25 and 26.

The solenoid air valves B', C', D', E', F', J', K' and L' are of a well-known standard three-way type that pass air pressure therethrough when the solenoid is energized and when de-energized cuts off the passage of air therethrough from the supply source and exhausts the air pressure on its outlet side. One type of such valve that is now employed comprises an elongated casing having an opening in its lower end which is threaded on a main air pressure supply line 439 having a pressure regulator 440a, of any well-known type, therein (Fig. 3) so as to normalize the air pressure flowing to the valves against violent fluctuations occurring in the air pressure system. Also, a pressure switch 440 is connected in the air supply line 439 and functions as a safety cut-out device by controlling an electric circuit, 476a—476b, that stops motors M and 100 to render the machine inoperative when the air pressure falls below a safe operating pressure for actuating the clutches of the machine.

The clutch cone 96, as before described, serves both the main feed clutch 87 and the fast-motion clutch 94, more clearly shown in Figs. 1 and 3, and is moved to its two clutching positions and to its neutral position by a plunger mechanism P that is actuated by air pressure to engage fast-motion clutch 94 and to disengage main feed clutch 87 or to neutral position and that is actuated by spring biasing means to engage the main feed clutch 87 and disengage the fast-motion clutch 94. This plunger mechanism is indicated in Fig. 1 as disposed in about the center of the headstock casing 20 behind the dog drum 121.

Having thus described the invention in the manner in which it is to be performed it is to be understood that the precise construction and arrangement shown and described is acceptable to modification and variation. Therefore, the invention is not to be limited except by the spirit of the appended claims.

What we claim is:

1. In a machine-tool, a turret slide, an indexible turret rotatably mounted on said slide and having a plurality of faces thereon, means for indexing the turret, means for locking said turret in indexed position and including a fixed abutment on said slide adjacent the turret and a slidable lock member movable into and out of position between said abutment and an opposing surface on said turret, a spring normally biasing said lock member to locking position between said abutment and said opposing surface and positioned remote from said lock member and exerting its force at an angle to said member, and an equalizing toggle pivotally mounted within the slide, one end of said spring being connected to said slide and the other end being connected to one end of said equalizing toggle, and the other end of said toggle being connected to said lock member.

2. The machine of claim 1 in which the equalizing toggle comprises a bell-crank lever having one end connected to said spring and its other end pivotally connected with said lock member, and a link pivotally connected at one end to said slide and its other end pivotally connected to the elbow portion of said lever.

3. In a machine-tool, a turret slide, an indexible turret rotatably mounted on said slide and having a plurality of faces thereon, means for indexing the turret, means for locking said turret in indexed position and including a fixed abutment on said slide adjacent the turret and a slidable lock member on said slide movable into and out of position between said abutment and an opposing surface on said turret, a spring on said slide normally biasing said lock member to locking position between said abutment and said opposing surface, withdrawing means carried by said slide synchronized with the indexing means for moving the lock member out of locking position prior to indexing, the improvement comprising a part positively actuated in timed relation with said indexing means for pushing said lock member in tight binding position between said fixed abutment and the opposing surface on said turret, after said biasing means has returned said lock member to locking position.

4. In a machine-tool, a turret slide, an indexible turret rotatably mounted on said slide and having a plurality of tool-carrying surfaces thereon, means for indexing said turret, means for locking said turret in indexing position and including a fixed abutment on said slide adjacent said turret, a plurality of abutment surfaces on the turret corresponding in number to the indexing positions of the turret and adapted to successively oppose said fixed abutment on the slide, and a slidable lock member movable into and out of position between said fixed abutment and an opposing surface on said turret, a swingable arm pivotally mounted to said slide and having its distal end in pivotal engagement with one end of said lock member, an operating cam element on said slide timed to actuate said arm to withdraw said lock member from locking position, prior to the indexing of said turret, the improvement comprising another operating cam element on said slide positioned and timed to engage a portion of said arm, after the indexing of said turret, and exerting a force thereon to force said lock member into tight binding relation between said fixed abutment and an opposing face upon said turret, whereby the turret is accurately located and clamped in position.

5. In a machine-tool, a turret slide, an indexible turret rotatably mounted on said slide and having a plurality of tool-carrying surfaces thereon, means for indexing said turret, means for locking said turret in indexing position and including a fixed abutment on said slide adjacent said turret, a plurality of abutment surfaces on the turret corresponding in number to the indexing positions of the turret and adapted to successively oppose said fixed abutment on the slide, and a slidable lock member mounted in the slide and movable into and out of position between said fixed abutment and an opposing surface on said turret and normally biased to be moved to locking position, a swingable arm pivotally mounted to said slide and having its distal end in pivotal engagement with one end of said lock member, an operating cam element on said slide timed to actuate said arm to withdraw said lock member from locking position and against its bias, prior to the indexing of said turret, and to release said arm to the influence of its bias after said indexing, the improvement comprising another operating cam element on said slide positioned and timed to engage a portion of said arm after the indexing of said turret and exerting a force thereon to force said lock member into tight binding relation between said fixed abutment and an opposing face upon said turret, whereby the turret is accurately located and clamped in position.

6. In a machine-tool, a turret slide, an indexible turret rotatably mounted on said slide and having a plurality of tool-carrying surfaces thereon, means for indexing said turret, means for locking said turret in indexing position and including a fixed abutment on said slide adjacent said turret, a plurality of abutment surfaces on the turret corresponding in number to the indexing positions of the turret and adapted to successively oppose said fixed abutment on the turret, and a slidable lock member on said slide movable into and out of position between said fixed abutment and an opposing surface on said turret, a disc-cam on said slide for reciprocating said slide and for indexing said turret, a swingable arm pivotally mounted to said slide and having its distal end in pivotal engagement with one end of said lock member, a cam element on said disc-cam for actuating said arm to withdraw said lock member from locking position, prior to the indexing of said turret, the improvement comprising another cam element on said disc-cam positioned to engage a portion of said arm, after the indexing of said turret and exerting a force thereon to force said lock member into tight binding relation between said fixed abutment and an opposing face upon said turret, whereby the turret is accurately located and clamped in position.

7. In a machine-tool, a reciprocal slide or carriage, a cam member for reciprocating said slide and having a dwell portion that retains the slide in one position while said cam is still operating, a slide-tool actuator for operating a slide-tool mountable on said slide, the improvement comprising the slide-tool actuator including a reciprocable part carried by said slide, a swingable abutment on said part and limited in its movement in one direction and biased to the limit of said movement, abutment-engaging means on said cam to engage said abutment when said cam is in its dwell, to move said reciprocating part of said slide-tool actuator in one direction for rendering said slide-tool effective, a re-setting member movable by said reciprocal part when the slide-tool is rendered effective, said resetting member to be engaged by a second abutment-engaging means on the cam to move said slide-tool reciprocal part in its other direction, thus returning said slide-tool to its ineffective position.

8. In a machine-tool, a reciprocal slide or carriage, a cam member for reciprocating said slide and having a dwell portion that retains the slide in one position while said cam is still operating, a slide-tool actuator for operating a slide-tool mountable on said slide, the improvement comprising the slide-tool actuator including a reciprocable part carried by the turret-slide, a swingable abutment on said part and limited in its movement in one direction and biased to the limit of said movement, an abutment-engaging element on said cam to engage said abutment in its biased position, when said slide is in its dwell to move said reciprocal part of said slide-tool actuator in one direction and rendering said slide-tool effective, and a lever pivoted to said slide and connected with said reciprocable part of the slide tool actuator and movable by the latter when said slide-tool is rendered effective, to a position to be engaged by a second abutment-engaging element on said cam and moving said slide-tool reciprocal part in its other direction, thus returning said slide-tool to its ineffective position.

9. In a machine-tool, a turret slide, an indexible turret rotatably mounted on said slide, a cam member for reciprocating said slide and for indexing said turret and having a dwell portion that retains the slide in its forwardmost position while said cam is still operating, a slide-tool actuator for operating a slide-tool mountable on said turret, the improvement comprising the slide-tool actuator including a reciprocable rod carried by the turret slide, a swingable abutment pivoted on said rod and limited in its movement in one direction and biased to the limit of said movement, an abutment-engaging element on said cam to engage said abutment in its biased position, when said slide is in its forwardmost position and said cam is in its dwell, moving said rod in one direction, to render said slide-tool effective, and a lever pivoted intermediate its end to said slide and having one end connected with said rod and the other end being movable by said rod, when said slide-tool is rendered effective, to a position to be engaged by a second abutment-engaging element, for moving said rod in its other direction, thus returning said slide-tool to its ineffective position, all while the cam is in its dwell.

J. EARLE MAKANT.
GORDON W. SMITHSON.
KENNETH R. WUNSCHEL.

REFERENCES CITED

The following references are of record in the file of this patent:

UNITED STATES PATENTS

| Number | Name | Date |
|---|---|---|
| 870,499 | English | Nov. 5, 1907 |
| 1,511,447 | Drissner | Oct. 14, 1924 |
| 2,455,876 | Potter et al. | Dec. 7, 1948 |
| 2,571,288 | Potter et al. | Oct. 16, 1951 |